(12) United States Patent
Sato

(10) Patent No.: US 7,738,191 B2
(45) Date of Patent: Jun. 15, 2010

(54) SINGLE FOCUS LENS

(75) Inventor: Kenichi Sato, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 917 days.

(21) Appl. No.: 11/528,383

(22) Filed: Sep. 28, 2006

(65) Prior Publication Data

US 2007/0070510 A1  Mar. 29, 2007

(30) Foreign Application Priority Data

Sep. 29, 2005 (JP) .............................. P2005-284714

(51) Int. Cl.
*G02B 9/14* (2006.01)
*G02B 3/02* (2006.01)
*G02B 13/00* (2006.01)

(52) U.S. Cl. ..................... 359/785; 359/716; 359/784

(58) Field of Classification Search ............... 359/716, 359/784, 785
See application file for complete search history.

(56) References Cited

U.S. PATENT DOCUMENTS

| 6,992,840 | B2 | 1/2006 | Takeuchi et al. | |
|---|---|---|---|---|
| 7,199,948 | B1 * | 4/2007 | Sato | 359/785 |
| 7,251,083 | B2 * | 7/2007 | Kubota et al. | 359/785 |
| 2004/0190162 | A1 | 9/2004 | Sato | |
| 2005/0041306 | A1 | 2/2005 | Matsuo | |
| 2005/0094292 | A1 | 5/2005 | Cahall et al. | |

FOREIGN PATENT DOCUMENTS

| CN | 1512197 A | | 7/2004 |
|---|---|---|---|
| CN | 2695994 Y | | 4/2005 |
| EP | 1 348 990 A1 | | 10/2003 |
| EP | 1 562 061 A1 | | 8/2005 |
| EP | 1770423 A1 | * | 4/2007 |
| JP | 10-48516 A | | 2/1998 |

OTHER PUBLICATIONS

European Office Action mailed May 8, 2009 for European Application No. 06020412.0.

* cited by examiner

*Primary Examiner*—David N Spector
(74) *Attorney, Agent, or Firm*—Birch, Stewart, Kolasch & Birch, LLP

(57) ABSTRACT

A single focus lens comprises: a first lens of positive power having a convex-shaped surface on an object side; a second lens of a negative meniscus lens having, on the object side, a concave-shaped surface on its paraxial axis; and a third lens of an aspheric lens having, on the object side, a convex-shaped surface on its paraxial axis, in this order from the object side, wherein the single focus lens satisfies the predetermined conditions.

8 Claims, 5 Drawing Sheets

EXAMPLE 1

FIG. 3

| EXAMPLE 1: BASIC LENS DATA | | | | |
|---|---|---|---|---|
| Si (SURFACE NUMBER) | Ri (CURVATURE RADIUS) | di (BETWEEN-SURFACE DISTANCE) | Ndj (REFRACTIVE INDEX) | νdj (ABBE NUMBER) |
| *1 | 1.7476 | 0.920 | 1.50869 (NdB) | 56.0 (νdB) |
| *2 | 9.0601 | 0.808 | | |
| *3 | -1.8755 | 0.700 | 1.58362 (NdA) | 30.2 (νdA) |
| *4 | -5.6550 | 0.100 | | |
| *5 | 1.9872 | 1.369 | 1.50869 (NdB) | 56.0 (νdB) |
| *6 | 3.2265 | 1.480 | | |
| 7 | ∞ | 0.300 | 1.51680 | 64.2 |
| 8 | ∞ | | | |

(*: ASPHERIC SURFACE)   (f=4.78mm, FNO.=3.2, 2ω=68.9°)

FIG. 4

| EXAMPLE 1: ASPHERIC SURFACE DATA | | | |
|---|---|---|---|
| COEFFICIENT | SURFACE NUMBER | | |
| | 1st SURFACE | 2nd SURFACE | 3rd SURFACE |
| K | 3.79762 | 1.00000 | 2.76632 |
| $A_3$ | -3.82953E-02 | 2.27249E-02 | -4.01460E-02 |
| $A_4$ | 1.55617E-01 | -8.68252E-02 | 1.11656E-01 |
| $A_5$ | -5.51131E-01 | 1.60272E-01 | -5.81200E-03 |
| $A_6$ | 4.80194E-01 | -1.72376E-01 | -7.84214E-02 |
| $A_7$ | 1.40531E-02 | 1.14040E-01 | 3.28318E-02 |
| $A_8$ | -3.69925E-01 | 1.07510E-02 | 6.56035E-02 |
| $A_9$ | 3.83120E-01 | -1.32449E-01 | 2.20053E-02 |
| $A_{10}$ | -3.85711E-01 | 7.45259E-02 | -4.44707E-02 |
| | 4th SURFACE | 5th SURFACE | 6th SURFACE |
| K | 5.29932 | -19.73301 | -18.07550 |
| $A_3$ | -2.31626E-01 | -1.10803E-01 | 9.06730E-02 |
| $A_4$ | 4.55296E-02 | -1.91061E-02 | -1.46715E-01 |
| $A_5$ | 5.63457E-02 | 1.96404E-02 | 6.27171E-02 |
| $A_6$ | 1.05604E-03 | 9.93671E-03 | -3.77200E-03 |
| $A_7$ | -6.85974E-03 | -1.61660E-03 | -5.99399E-03 |
| $A_8$ | 1.28329E-02 | -1.38199E-03 | 4.37422E-04 |
| $A_9$ | 1.12153E-02 | 1.13782E-04 | 8.28209E-04 |
| $A_{10}$ | -9.95375E-03 | 1.80142E-05 | -1.92559E-04 |

FIG. 5

| EXAMPLE 2: BASIC LENS DATA ||||| 
|---|---|---|---|---|
| Si (SURFACE NUMBER) | Ri (CURVATURE RADIUS) | di (BETWEEN-SUR-FACE DISTANCE) | Ndj (REFRACTIVE INDEX) | νdj (ABBE NUMBER) |
| *1 | 1.8518 | 1.00 | 1.49023 (NdB) | 57.5 (νdB) |
| *2 | 25.7507 | 0.82 | | |
| *3 | −1.8755 | 0.70 | 1.58362 (NdA) | 30.2 (νdA) |
| *4 | −7.8809 | 0.10 | | |
| *5 | 1.7979 | 1.30 | 1.49023 (NdB) | 57.5 (νdB) |
| *6 | 2.8663 | 1.59 | | |
| 7 | ∞ | 0.30 | 1.51680 | 64.2 |
| 8 | ∞ | | | |

(*: ASPHERIC SURFACE)   (f=5.02mm, FNO.=3.2, 2ω=66.5°)

FIG. 6

| EXAMPLE 2: ASPHERIC SURFACE DATA ||||
|---|---|---|---|
| COEFFI-CIENT | SURFACE NUMBER |||
| | 1st SURFACE | 2nd SURFACE | 3rd SURFACE |
| K | 2.76424 | 1.00000 | 2.76632 |
| A3 | −3.32494E−02 | 3.50186E−02 | −4.01460E−02 |
| A4 | 1.67196E−01 | −1.50273E−02 | 1.11656E−01 |
| A5 | −5.82113E−01 | 2.70975E−01 | −5.81200E−03 |
| A6 | 6.61561E−01 | −2.90373E−01 | −7.84214E−02 |
| A7 | −7.31587E−02 | 8.88392E−02 | 3.28318E−02 |
| A8 | −5.59035E−01 | 7.52292E−02 | 6.56035E−02 |
| A9 | 4.84869E−01 | −6.97206E−02 | 2.20053E−02 |
| A10 | −1.64478E−01 | −2.05490E−03 | −4.44707E−02 |
| | 4th SURFACE | 5th SURFACE | 6th SURFACE |
| K | −5.38616 | −18.80179 | −8.75691 |
| A3 | −2.75974E−01 | −1.40170E−01 | 5.90628E−02 |
| A4 | 6.33176E−02 | 1.48778E−03 | −1.35557E−01 |
| A5 | 7.53952E−02 | 1.95086E−02 | 6.60420E−02 |
| A6 | −9.48143E−03 | 7.54219E−03 | −5.24352E−03 |
| A7 | −1.33144E−02 | −3.18279E−03 | −6.37728E−03 |
| A8 | 1.60329E−02 | −1.25337E−03 | 5.72598E−04 |
| A9 | 1.32481E−02 | 1.17689E−03 | 8.81395E−04 |
| A10 | −1.12398E−02 | −3.14538E−04 | −2.16362E−04 |

FIG. 7

| VALUES REGARDING CONDITIONAL EXPRESSIONS | | |
|---|---|---|
| CONDITIONAL EXPRESSION | EXAMPLE 1 | EXAMPLE 2 |
| CONDITIONAL EXPRESSION (1) $f1/f$ | 0.85 | 0.80 |
| CONDITIONAL EXPRESSION (2) $vdA$ | 30.2 | 30.2 |
| CONDITIONAL EXPRESSION (3) $vdB$ | 56.0 | 57.5 |
| CONDITIONAL EXPRESSION (4) $NdA$ | 1.584 | 1.584 |
| CONDITIONAL EXPRESSION (5) $NdB$ | 1.504 | 1.490 |
| CONDITIONAL EXPRESSION (6) $L/D$ | 1.69 | 1.74 |
| CONDITIONAL EXPRESSION (7) $RA/f$ | 0.36 | 0.37 |

EXAMPLE 1

FNO. = 3.20
SPHERICAL ABERRATION

ω = 34.4°
ASTIGMATISM

ω = 34.4°
DISTORTION

EXAMPLE 2

FNO. = 3.20
SPHERICAL ABERRATION

ω = 33.3°
ASTIGMATISM

ω = 33.3°
DISTORTION

SINGLE FOCUS LENS

BACKGROUND OF THE INVENTION

1. Field of the Invention

The present invention relates to a single focus lens favorably used for a small-sized apparatus having an image pick-up feature, for example, a mobile telephone having a camera feature, a PDA (Personal Digital Assistant), and a digital still camera, etc.

2. Description of the Related Art

An image pick-up device such as a CCD (Charge Coupled Device) and a CMOS (Complementary Metal Oxide Semiconductor) is used in an image pick-up apparatus such as a digital still camera. In recent years, such an image pick-up device has been further remarkably downsized. Therefore, it has been demanded that a pick-up apparatus and a lens built in the pick-up apparatus are downsized and reduced in weight. Also, in recent years, an image pick-up device having a large number of pixels has been developed in order to achieve high image quality. In line therewith, performance by which high resolution and high contrast can be brought about is required for the lens system.

For example, a pick-up lens described in the following JP-A-10-48516 is available as an image pick-up lens used for such an image pick-up apparatus. JP-A-10-48516 describes an image pick-up lens composed of three lenses which are the first, the second and the third lenses in order from the object side. In the image pick-up lens, the power of the first lens is low, and an aperture stop is disposed between the second lens and the third lens.

In regard to recent image pick-up devices, downsizing and high concentration of pixels have been advanced as described above. In line therewith, high resolution performance and compacting in structure has been demanded for an image pick-up lens. The image pick-up lens described in JP-A-10-48516 described above has achieved performance and compactness to some degree with a fewer number of a lenses of three-lens construction. However, it is desired that a lens system of further compactness and higher performance is developed.

SUMMARY OF THE INVENTION

The present invention has been made in view of such problems, and an object thereof is to provide a single focus lens which can achieve a compact lens system having high performance while having a fewer number of lenses.

A single focus lens according to the present invention includes:

a first lens of positive power having a convex-shaped surface on an object side;

a second lens of a negative meniscus lens having, on the object side, a concave-shaped surface on its paraxial axis; and a third lens of an aspheric lens having, on the object side, a convex-shaped surface on its paraxial axis, in this order from the object side, wherein the single focus lens satisfies the following conditions:

$$1.5 > f1/f > 0.6 \quad (1)$$

$$24.0 < vdA < 32.0 \quad (2)$$

$$55.5 < vdB < 58.5 \quad (3)$$

$$1.55 < NdA \quad (4)$$

$$1.47 < NdB < 1.55 \quad (5)$$

$$1.8 > L/D \quad (6)$$

$$0.30 < RA/f < 0.40 \quad (7)$$

where f: Entire focal distance, f1: Focal distance of the first lens, vdA: Abbe number of the second lens, vdB: Abbe number of the first lens and the third lens, NdA: Refractive index at d-line of the second lens, NdB: Refractive index at d-line of the first lens and the third lens, RA: Paraxial curvature radius of a surface at the object side of the first lens, L: Distance on the optical axis from the surface at the object side of the first lens to an imaging position, and D: Maximum image height.

A single focus lens according to the present invention may further include an aperture stop disposed at the object side from the surface at an image side of the first lens on the optical axis.

With the single focus lens according to the present invention, by satisfying the conditional expressions (2), (3), (4), and (5) and adequately preparing materials of the respective lenses while satisfying the conditional expressions (1), (6) and (7) and securing the compactness, a compact lens system of high performance can be achieved while being composed of only three lenses.

BRIEF DESCRIPTION OF THE DRAWINGS

FIG. 3 is a view depicting basic lens data of a single focus lens according to Example 1;

FIG. 4 is a view depicting data of an aspheric surface of a single focus lens according to Example 1;

FIG. 5 is a view depicting basic lens data of a single focus lens according to Example 2;

FIG. 6 is a view depicting data of an aspheric surface of a single focus lens according to Example 2;

FIG. 7 is a view collectively depicting the values of the conditional expressions with respect to the respective examples;

DETAILED DESCRIPTION OF THE INVENTION

Hereinafter, a detailed description is given of an embodiment of the present invention with reference to the drawings.

Figure 1:
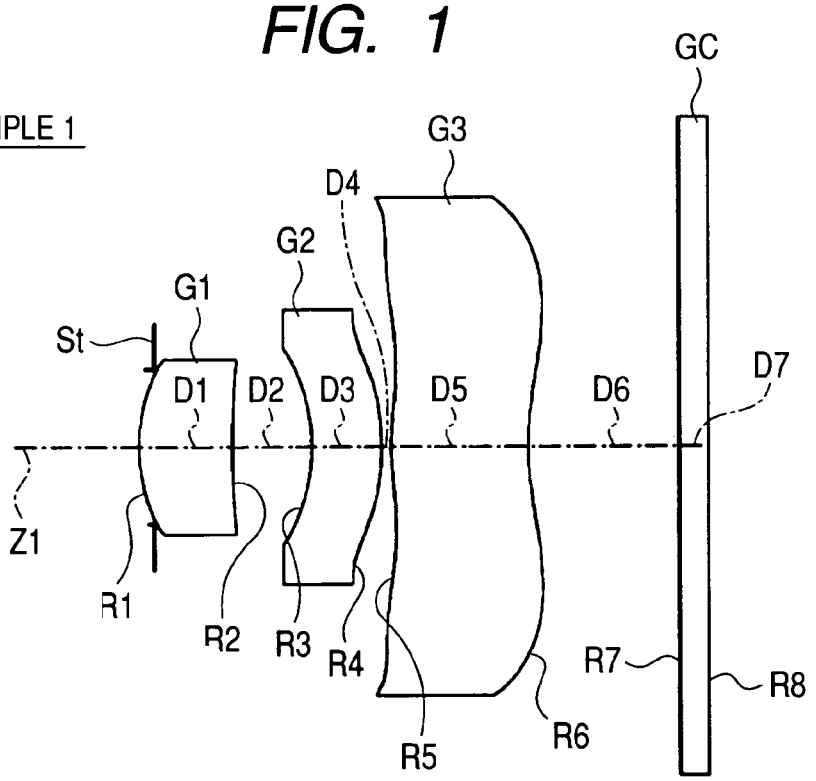
FIG. 1 shows the first configurational example of a single focus lens according to one embodiment of the present invention, which is a lens sectional view corresponding to Example 1.
Figure 2:
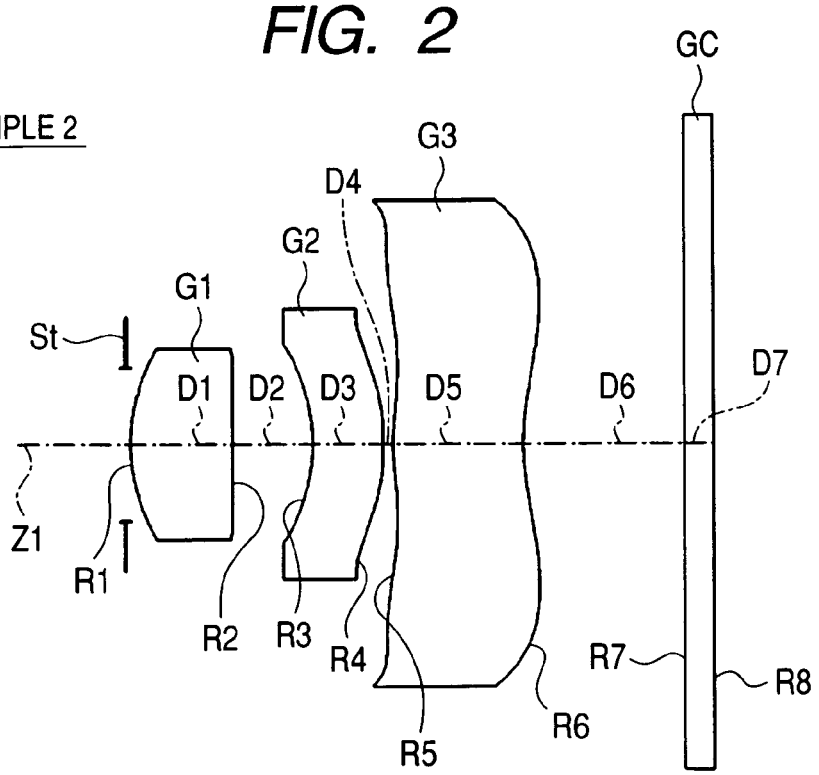
FIG. 2 shows the second configurational example of a single focus lens according to one embodiment of the present invention, which is a lens sectional view corresponding to Example 2.

FIG. 1 is a first configurational example of a single focus lens according to one embodiment of the present invention. The configurational example corresponds to a lens configuration of the first numerical mode (FIG. 3 and FIG. 4) described later. In addition, FIG. 2 is a second configurational example. The configurational example of FIG. 2 corresponds to a lens configuration of the second numerical mode (FIG. 5 and FIG. 6) described later. In FIG. 1 and FIG. 2, reference symbol Ri denotes the curvature radius of the (i)th surface (i=1 through 8) with the symbol affixed so that the side of a component at the extreme object side is made into the first side and the symbol is gradually increased toward the image side (that is, the imaging side). Reference symbol Di denotes a between-surface distance on the optical axis Z1 between the (i)th side and the (i+1)th side. Also, since the basic construction is common in the respective configurational examples, hereinafter, a description is given of the construction of a single focus lens depicted in FIG. 1 as the basis.

The single focus lens is mounted in a small-sized apparatus having an image pick-up feature, for example, a PDA (Personal Digital Assistant), a video camera, and a digital camera, etc., and is favorably used. The single focus lens is provided with the first lens G1, the second lens G2 and the third lens G3 in order from the object side along the optical axis Z1. The aperture stop St is disposed not at the image-side surface of the first lens G1 but at the object side thereof on the optical axis Z1. It is preferable that the aperture stop St is disposed between the object side surface of the first lens G1 and the image-side surface thereof on the optical axis Z1.

An image pick-up device (not shown) such as a CCD, etc., is disposed on the imaging plane (pick-up plane) of the single focus lens. Various types of optical components GC may be disposed between the third lens G3 and the pick-up plane in accordance with the configuration at the camera side in which the lens is mounted. For example, cover glass for protecting the pick-up plane and flat type optical components such as various types of optical filters may be disposed therebetween.

It is preferable that the first lens G1, the second lens G2, and the third lens G3 are all aspheric lenses made of a plastic material. The first lens G1 has positive power, the object side surface of which is convex-shaped. The second lens G2 is a negative meniscus lens, the object side surface of which is concave-shaped on the paraxial axis. The third lens G3 is made into an aspheric lens, the side at the object side of which is convex-shaped on the paraxial axis.

It is preferable that the surface at the object side of the third lens G3 is shaped so that positive power thereof is gradually weakened toward the periphery. It is preferable that the surface at the image side of the third lens G3 is concave-shaped to the image side on the paraxial axis, negative power thereof is weakened toward the periphery, and power is turned into positive power at the periphery.

The single focus lens satisfies the following conditional expressions, where f is the entire focal distance, f1 is the focal distance of the first lens G1, vdA is the Abbe number of the second lens G2, vdB is the Abbe number of the first lens G1 and the third lens G3, NdA is the refractive index at d-line of the second lens G2, NdB is the refractive index at d-line of the first lens G1 and the third lens G3, RA is the paraxial curvature radius of the surface at the object side of the first lens G1, L is the distance on the optical axis from the surface at the object side of the first lens to an imaging position, and D is the maximum image height. L is made into a value in which the thickness of an optical component such as a cover glass is converted into air.

$$1.5 > f1/f > 0.6 \quad (1)$$

$$24.0 < vdA < 32.0 \quad (2)$$

$$55.5 < vdB < 58.5 \quad (3)$$

$$1.55 < NdA \quad (4)$$

$$1.47 < NdB < 1.55 \quad (5)$$

$$1.8 > L/D \quad (6)$$

$$0.30 < RA/f < 0.40 \quad (7)$$

Next, a description is given of actions and effects of the single focus lens constructed as described above. By satisfying the conditional expressions (2), (3), (4), and (5) and optimizing materials of the respective lenses in refractive index and dispersion characteristics while satisfying the conditional expressions (1), (6) and (7) and securing the compactness, a compact lens system of high performance can be achieved while being composed of only three lenses as described above.

The conditional expression (1) pertains to the focal distance of the first lens G1. It is not preferable that the entire length becomes excessively long if exceeding the numerical range, and the pupil becomes excessively short if less than the numerical range. The conditional expression (6) expresses the ratio of the entire optical length on the optical axis Z1 to the maximum image height D. If exceeding the numerical value, it is not possible that the entire lens system is made sufficiently compact. The conditional expression (7) pertains to the curvature radius of the front surface of the first lens G1. It is not preferable that it becomes difficult to shorten the entire length of the lens if exceeding the numerical range, and that it becomes difficult to correct the spherical aberration and image surface curvature. In the single focus lens, the entire length is attempted to be shortened by making small the curvature radius of the front surface of the first lens G1 to make power comparatively large.

The conditional expressions (2) and (4) pertain to the characteristics of a material of the second lens G2. If a material having a small Abbe number and a large refractive index is used for the second lens G2 having negative power so that these conditional expressions are satisfied, it is possible to favorably correct the color aberration and image surface curvature. The conditional expressions (3) and (5) pertain to the characteristics of materials of the first lens G1 and the third lens G3. If the Abbe number and the refractive index are within the numerical range, necessary and sufficient performance can be obtained in regard to both the color aberration and the image surface curvature in a combination with the second lens G2, and, as materials of the first lens G1 and the third lens G3, it is possible to choose a material, which is inexpensive, easily available and optically well-stabilized (low distortion), such as acrylic resin or a cycloolefin polymer.

In addition, in the single focus lens, since the aperture stop St is disposed not at the image side of the first lens G1 but at the object side thereof on the optical axis Z1, further preferably between the object side surface of the first lens G1 and the image-side surface thereof on the optical axis Z1, it is possible to shorten the entire length including the aperture stop St. Further, in the single focus lens, since an aspheric surface is adequately employed for the respective lenses, a great aberration correction effect can be brought about. In particular, by adequately setting the aspheric surface shape of the third lens G3 with respect to the paraxial shape and peripheral shape, a greater effect can be brought about in connection to not only correction of the image surface curvature but also aberration correction.

As described above, according to the single focus lens according to the embodiment, since the predetermined conditional expressions are satisfied, and the materials of the respective lenses and power distribution are optimized, it is possible to achieve a compact lens system having high performance while being provided with only three lenses.

EXAMPLES

Next, a description is given of detailed numerical examples of a single focus lens according to the embodiment. Hereinafter, two numerical examples (Example 1 and Example 2) will be described at a time.

FIG. 3 and FIG. 4 show detailed lens data (Example 1) corresponding to the configuration of the single focus lens depicted in FIG. 1. In particular, FIG. 3 shows the basic lens data thereof, and FIG. 4 shows data pertaining to an aspheric surface. In addition, FIG. 5 and FIG. 6 show the detailed lens data (Example 2) corresponding to the configuration of the single focus lens depicted in FIG. 2. In particular, FIG. 5 shows the basic lens data, and FIG. 6 shows data pertaining to an aspheric surface.

With the single focus lenses according to the respective examples, the column of the side number Si in the lens data depicted in FIG. 3 and FIG. 5 shows the number of (i)th side (i=1 through 8) to which the symbol is affixed with the side of the extreme object side component made into the first side so that the symbol is gradually increased toward the image side. The column of the curvature radius Ri shows a value of the curvature radius of the (i)th side from the object side, corresponding to the symbol Ri affixed in FIG. 1 and FIG. 2. The column of the between-surface distance Di shows the interval on the optical axis between the (i)th surface Si from the object side and the (i+1)th surface side Si+1 as well. The unit of values of the curvature radius Ri and the between-surface distance Di is millimeters (mm). The columns of Ndj and vdj show the values of the refractive index and Abbe number corresponding to the d-line (wavelength: 587.6 nm) of the (j)th (j=1 through 4) optical element from the object surface including an optical component GC. FIG. 3 and FIG. 5 also show the values of paraxial focal distance f (mm) of the entire system, F-number (FNO.), and angle of view 2ω (ω: half angle of view).

Further, in the single focus lens according to Example 1, the aperture stop St is disposed at the position of 0.15 mm from the object surface side of the first lens G1 to the plane side on the optical axis Z1. In the single focus lens according to Example 2, the aperture stop St is disposed at a position of 0.05 mm from the object surface side of the first lens G1 to the plane side on the optical axis Z1.

In the respective lens data in FIG. 3 and FIG. 5, the symbol (*) affixed at the left side of the surface number shows that the lens surface is made aspheric. In all single focus lenses according to the respective examples, both sides of the first lens G1, the second lens G2 and the third lens G3 are made aspheric. The basic lens data in FIG. 3 and FIG. 5 show the numerical values of curvature radii in the vicinity of the paraxial axis of the optical axis as the curvature radii of these aspheric surfaces.

FIG. 4 and FIG. 6 show the aspheric surface data in the single focus lenses according to Examples 1 and 2. For the numerical values depicted as the aspheric surface data, the symbol "E" shows that the successive numerical value is a "power index" with 10 made into the lower numerical value. The numerical value that is displayed with the exponential function designated as 10 as the lower numerical value is multiplied with the numerical value in front of E is shown. For example, [1.0E-02] shows [$1.0 \times 10^{-2}$].

As the aspheric surface data, values of the respective coefficients A, and K in the expression of the aspheric surface shape, which is expressed by the following expression (A) are shown. In further detail, Z shows the length (mm) of a perpendicular line from the point on the aspheric surface, which is located at a height h from the optical axis, down to the tangential plane (plane vertical to the optical axis) of the top point of the aspheric surface. In the respective single focus lenses according to the respective examples, the respective aspheric surfaces are expressed by effectively utilizing even number order coefficients $A_4$, $A_6$, $A_8$, $A_{10}$ and odd number order coefficients $A_3$, $A_5$, $A_7$, $A_9$.

$$Z = C \cdot h^2 / \{1 + (1 - K \cdot C^2 \cdot h^2)^{1/2}\} + A_3 \cdot h^3 + A_4 \cdot h^4 + A_5 \cdot h^5 + A_6 \cdot h^6 + A_7 \cdot h^7 + A_8 \cdot h^8 + A_9 \cdot h^9 + A_{10} \cdot h^{10} \quad (A)$$

where

Z is a depth (mm) of the aspheric surface, h is a distance (height) (mm) from the optical axis to the lens side, K is eccentricity, C is a paraxial curvature=1/R (R is a paraxial curvature radius), and $A_i$ is the (i)th aspheric surface coefficient FIG. 7 shows values in the respective conditional expressions described above, as aggregates in regard to the respective examples. As has been understood in FIG. 7, the values of the respective examples are within the numerical ranges of the respective conditional expressions.

Figure 8A:
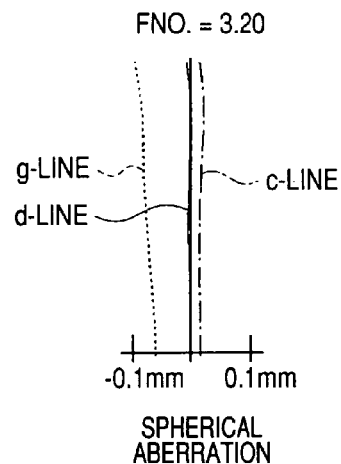
FIG. 8A is an aberration view showing spherical aberration of a single focus lens according to Example 1.
Figure 8B:
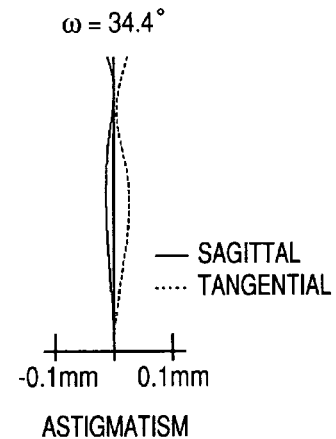
FIG. 8B is an aberration view showing astigmatism of a single focus lens according to Example 1.
Figure 8C:
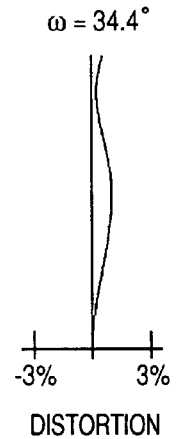
FIG. 8C is an aberration view showing distortion of a single focus lens according to Example 1.
Figure 9A:
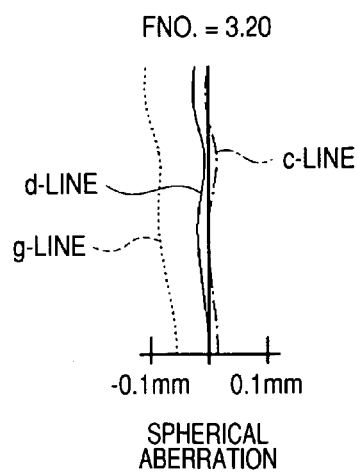
FIG. 9A is an aberration view showing spherical aberration of a single focus lens according to Example 1.
Figure 9B:
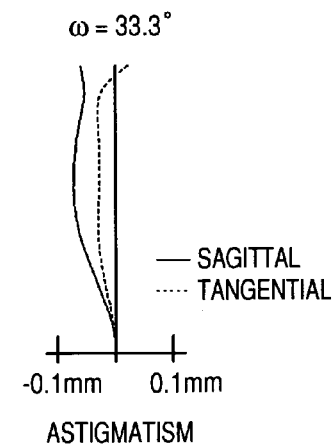
FIG. 9B is an aberration view showing astigmatism of a single focus lens according to Example 1.
Figure 9C:
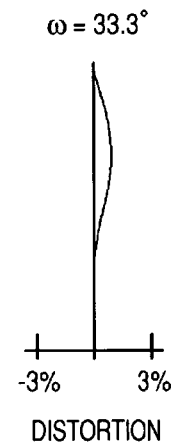
FIG. 9C is an aberration view showing distortion of a single focus lens according to Example 1.

FIG. 8A through FIG. 8C show the spherical aberration, astigmatism, and distortion in the single focus lens according to Example 1. In the respective aberration views, aberrations are depicted with the d-line made into the reference wavelength. However, in the spherical aberration views, aberrations are shown in regard to the g-line (wavelength 435.8 nm) and c-line (wavelength 656.3 nm). In the astigmatic views, the solid lines show aberrations in the sagittal direction, and the broken lines show aberrations in the tangential direction. ω shows the half angle of view. Similarly, various aberrations of the single focus lens according to Example 2 are shown in FIG. 9A through FIG. 9C.

As has been understood from the respective numerical data and various aberration views described above, with the respective examples, it is possible to achieve a compact lens system for which the aberrations are satisfactorily corrected while being provided with a fewer number of lenses.

Also, the present invention is not limited to the above-described embodiment and the respective examples. The present invention may be subjected to various modifications. For example, values of the curvature radius, between-surface distance and refractive index of the respective lens components are not limited to the values shown in the respective numerical examples, but may take other values.

With the single focus lens according to the present invention, a single focus lens is provided with a first lens of positive power having a convex shape at the surface of the object side, a second lens of a negative meniscus lens having a concave shape at the surface of the object side on the paraxial axis, and a third lens of an aspheric lens having a convex shape at the surface of the object side on the paraxial axis, and the single focus lens satisfies the predetermined conditional expressions, wherein since materials of the respective lenses are attempted to be optimized while securing the compactness, it is possible to achieve a compact lens system of high performance while being provided with only three lenses.

The entire disclosure of each and every foreign patent application from which the benefit of foreign priority has been claimed in the present application is incorporated herein by reference, as if fully set forth.

What is claimed is:

1. A single focus lens comprising:
a first lens of positive power having a convex-shaped surface on an object side;
a second lens of a negative meniscus lens having, on the object side, a concave-shaped surface on its paraxial axis; and
a third lens of an aspheric lens having, on the object side, a convex-shaped surface on its paraxial axis,
in this order from the object side,
wherein the single focus lens satisfies the following conditions:

$$1.5 > f1/f > 0.6 \quad (1)$$

$$24.0 < vdA < 32.0 \quad (2)$$

$$55.5 < vdB < 58.5 \quad (3)$$

$$1.55 < NdA \quad (4)$$

$$1.47 < NdB < 1.55 \quad (5)$$

$$1.8 > L/D \quad (6)$$

$$0.30 < RA/f < 0.40 \quad (7)$$

where f: Entire focal distance,
f1: Focal distance of the first lens,
vdA: Abbe number of the second lens,
vdB: Abbe number of the first lens and the third lens,
NdA: Refractive index at d-line of the second lens,
NdB: Refractive index at d-line of the first lens and the third lens,
RA: Paraxial curvature radius of a surface at the object side of the first lens,
L: Distance on the optical axis from the surface at the object side of the first lens to an imaging position, and
D: Maximum image height.

2. The single focus lens according to claim 1, further comprising an aperture stop disposed at the object side from the surface at an image side of the first lens on the optical axis.

3. The single focus lens according to claim 1, further comprising an aperture stop disposed between the object side surface of the first lens and the image-side surface of the first lens on the optical axis.

4. The single focus lens according to claim 1, wherein the first lens, the second lens and the third lens are all aspheric lenses.

5. The single focus lens according to claim 1, wherein the first lens, the second lens and the third lens are made of a plastic material.

6. The single focus lens according to claim 1, wherein the surface at the object side of the third lens is shaped so that positive power thereof is gradually weakened toward the periphery.

7. The single focus lens according to claim 1, wherein the surface at the image side of the third lens is concave-shaped to the image side on the paraxial axis, negative power thereof is weakened toward the periphery, and power is turned into positive power at the periphery.

8. The single focus lens according to claim 1, wherein the first and the third lenses are made of acrylic resin or of a cycloolefin polymer.

* * * * *